J. BAKER.
DETACHABLE SECURING MEANS FOR TIRES.
APPLICATION FILED NOV. 19, 1907.
913,254.
Patented Feb. 23, 1909.
2 SHEETS—SHEET 1.
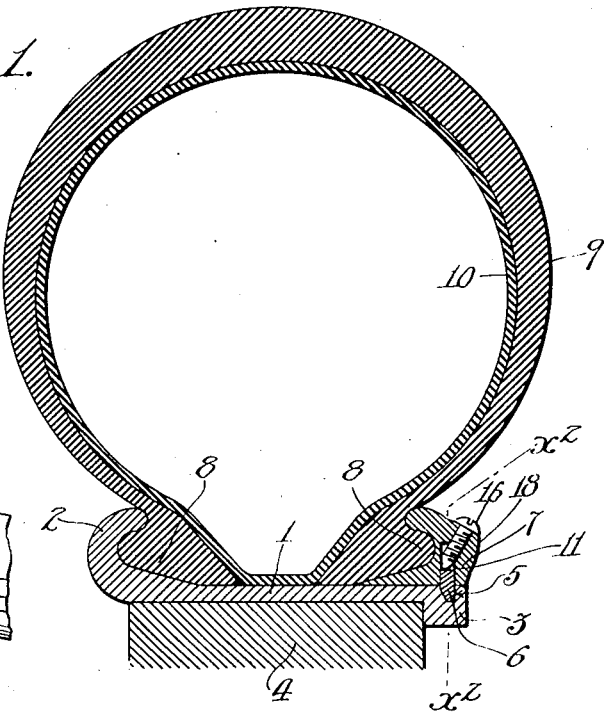
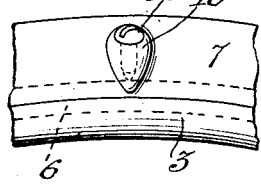
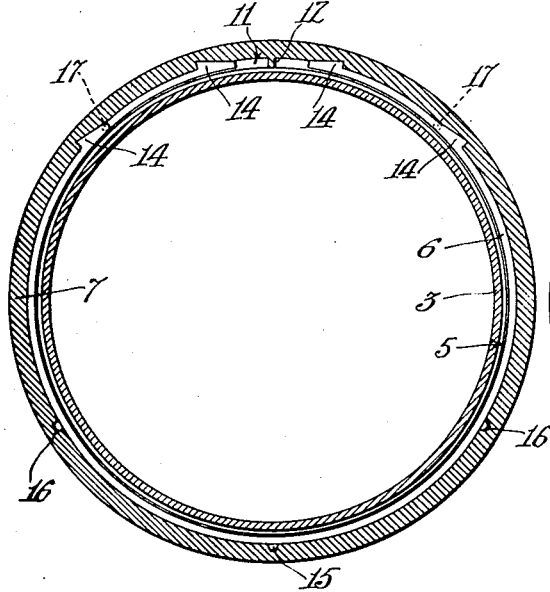
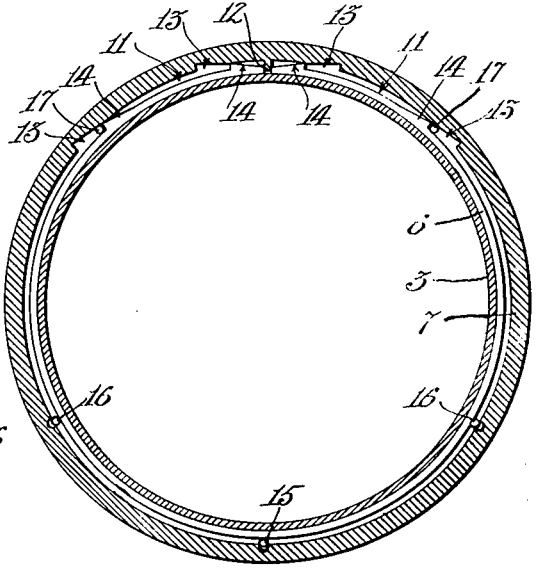
Witnesses:
Frank G. Graham.
Louis W. Gratz.
Inventor:
John Baker:
by Townsend & Hackley
his attys

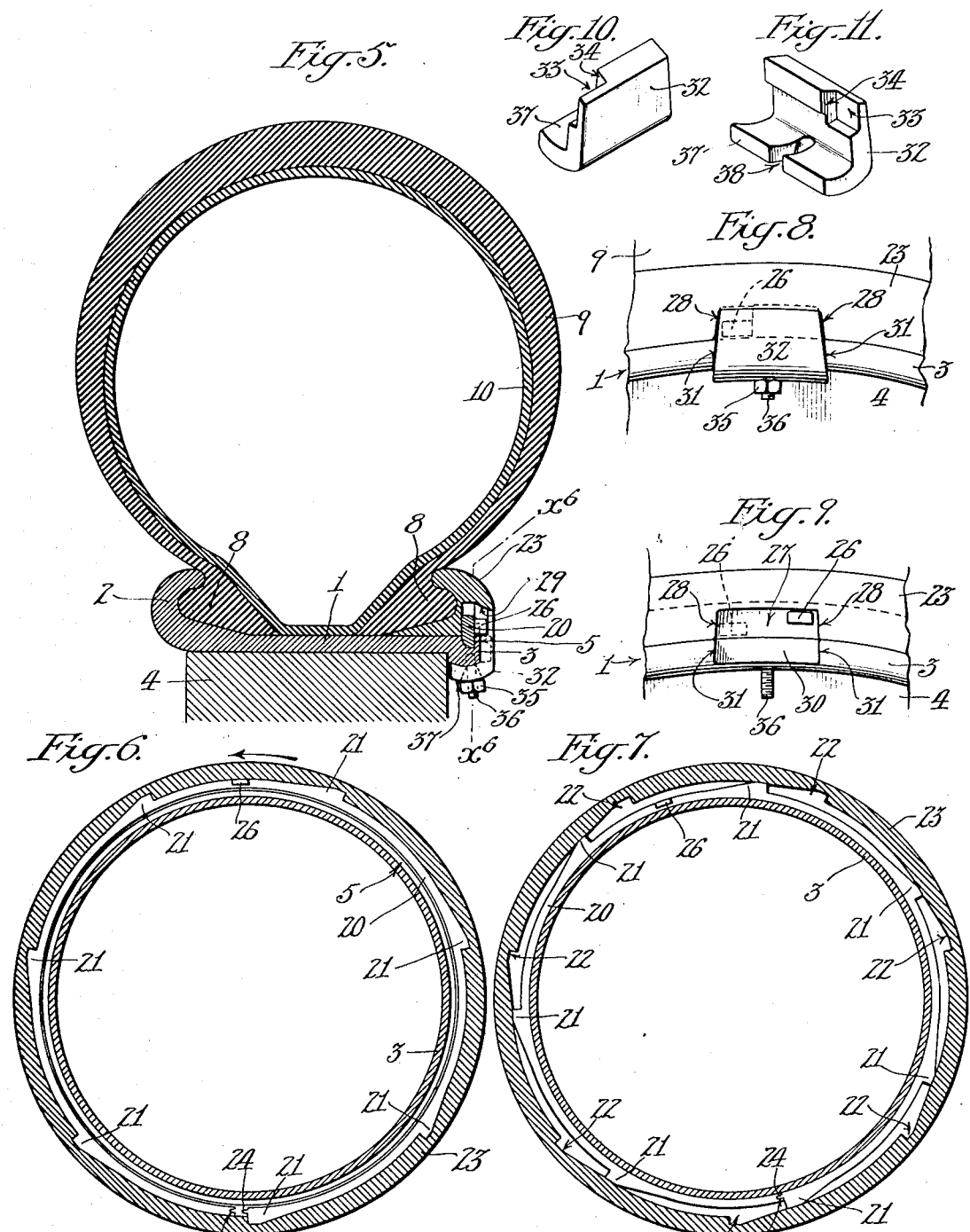

UNITED STATES PATENT OFFICE.

JOHN BAKER, OF PASADENA, CALIFORNIA.

DETACHABLE SECURING MEANS FOR TIRES.

No. 913,254.  Specification of Letters Patent.  Patented Feb. 23, 1909.

Application filed November 19, 1907. Serial No. 402,923.

*To all whom it may concern:*

Be it known that I, JOHN BAKER, a citizen of the United States, residing at Pasadena, in the county of Los Angeles and State of California, have invented certain Improvements in Detachable Securing Means for Tires, of which the following is a specification.

This invention relates to means for detachably securing tires to vehicle wheels, being particularly adapted for pneumatic or cushion tires.

The attaching means includes, with the rim, a retaining ring separable from the rim, and a locking ring for engaging both the rim and retaining ring for detachably securing the retaining ring on the rim; and the distinguishing feature of the invention is to provide for contracting the locking ring by a circumferential movement thereof to bring it into locking engagement with the rim, and to expand it by a circumferential movement to free it from the rim. The retaining ring when locked in place holds the tire on the rim, and when the retaining ring is unlocked it may be slipped off the rim to allow the tire to be removed or opened.

The accompanying drawings illustrate the invention and referring thereto :—Figure 1 is a cross section through a tire and rim constructed with one form of the invention. Fig. 2 is a section, on a reduced scale, through the complete rim, on a plane indicated by line $x^2$—$x^2$ in Fig. 1, and shows the locking ring expanded and out of engagement with the rim. Fig. 3 is a view similar to Fig. 2. Fig. 4 is a side view, on the scale of Fig. 1, of a portion of the rim adjacent a ring screw. Fig. 5 is a view similar to Fig. 1 of a modified form. Fig. 6 is a section, on a reduced scale through the complete rim, on a plane indicated by line $x^6$—$x^6$ in Fig. 5, the lug cover being removed. Fig. 7 is a view similar to Fig. 6 showing the locking ring contracted and in engagement with both the retaining ring and rim. Fig. 8 is a side elevation of a portion of the rim and retaining ring showing the lug cover in place. Fig. 9 is a view similar to Fig. 8 showing the lug cover removed. Fig. 10 is a perspective of the outer face of the lug cover. Fig. 11 is a perspective of the inner face of the lug cover.

In the form shown in Figs. 1 to 4, inclusive, 1 designates the rim having an integral retaining flange 2 on one edge and having a down turned flange 3 at its other edge which lies against the felly 4. The flange 3 has an annular groove 5, the inner wall of which is beveled, which is adapted to receive a split expansible locking ring 6 likewise beveled so that when the locking ring is forced into the groove 5 it is tightly wedged therein and rigidly held from movement or rattling. A retaining ring 7 is removably arranged in the rim 1 over the flange 3 and the flange 2 and retaining ring 7 receives flanges 8 of the tire casing 9. 10 is the inner air tube. The retaining ring 7 has an annular groove 11 which receives the locking ring 6 and a lug 12 forms a partition or abutment in the groove 11. The bottom wall of the groove 11 is formed with two inclined recesses 13 on each side of the lug 12, and the locking ring 6 is formed with two pairs of wedge shaped lugs 14, each pair of lugs 14 being near the end of the locking ring. When the locking ring is expanded, as shown in Fig. 2, the lugs 14 lie within the recesses 13 and the locking ring is out of engagement with the groove 5 in flange 3, thus permitting removal of the retaining ring 7 to permit the tire to be opened or removed. By imparting a circumferential movement to the locking ring to produce relative movement between the lugs 14 and recesses 13 the inclined walls of the recesses cause the lugs 14 to move inward, thus contracting the locking ring. This contraction of the locking ring is produced by means of screws 15, 16, 17, which are mounted in enlargements 18 in the retaining ring and are slanted inward, as shown in Fig. 1. Each screw has a beveled end as shown, which bears against the edge of the locking ring. To contract the locking ring the center screw 15 is first screwed in against the locking ring; next the two screws 16 are screwed in which slightly contracts the locking ring and draws its two ends closer to the lug 12; and then the screws 17 are screwed in, which brings the two ends of the locking ring against lug 12. As the two ends of the locking ring are in this manner moved toward the central lug 12, the inclined lugs 14 riding in the inclined recesses contract the locking ring so that it projects into the groove 5, and thus locks the retaining ring securely in place.

To unlock the retaining ring the screws are loosened in reverse order from locking and the spring of the locking ring causes it to expand until the lugs 14 are entirely seated in recesses 13 and the locking ring out of engagement with the groove 5.

In the form shown in Figs. 5 to 11, inclusive, the locking ring 20 is provided with inclined lugs 21 which are all inclined in the same direction and which are received by recesses 22 formed in the retaining ring 23. In this form a circumferential movement of the locking ring in the direction of the arrow, Fig. 6, causes the inclined lugs 21 to ride out of the recesses 22 and contract the locking ring so that it engages in the groove in the flange 3. One end of the locking ring has a tongue 24 which interlocks with a notch 25 in the other end when the locking ring is contracted. This circumferential movement is effectuated through the medium of a lug 26 formed in the locking ring and which is allowed movement by a recess 27, formed in the retaining ring. The recess 27 has inclined side walls 28 and an inclined undercut upper wall 29. The rim 1 also has a recess 30 with inclined side walls 31 in register with the walls 28. A driving block, not shown, may be held against the lug 26 and by pounding against the same the lug may be shifted from one side of the recess 27 to the other, thereby shifting the locking ring and contracting it. Fig. 6 shows the locking ring expanded and out of engagement with the groove in the rim. Fig. 7 shows it contracted and in engagement with the groove in the rim. In Fig. 9 the position of lug 26 with the locking ring expanded is shown in full lines and dotted lines show its position when the locking ring is contracted. In order to cover the lug 26 and lock it, a lug plate 32 is employed, shown in detail in Figs. 8, 10, and 11. The lug plate is wedge shaped to fit the inclined walls of recesses 27 and 30 as shown in Fig. 8 and has a recess 33 with a shoulder 34, the recess 33 receives the lug 26 when the lug plate is in position, while the shoulder 34 stands back of the lug 26 and thus locks the same preventing shifting or creeping of the locking ring. The lug plate is detachably secured in place by a covered nut 35 screwed on a stud 36 projecting from the flange 3, the lower flange 37 of the lug plate having a slot 38 which receives the stud 36 and enables withdrawal of the lug plate when released by nut 35.

What I claim is:—

1. A rim having a groove, a retaining ring having a groove, a locking ring in one groove, and coacting wedge means on the retaining ring and locking ring operated by a circumferential movement of the locking ring for changing its diameter to cause it to engage both grooves or to permit its expansion out of the groove in the rim to allow the retaining ring to be withdrawn from the rim.

2. A rim having a groove, a retaining ring having a groove, a locking ring in the groove in the retaining ring, and coacting wedge means on the retaining ring and locking ring operated by a circumferential movement of the locking ring for contracting the locking ring into engagement with the groove in the rim or to permit its expansion out of the groove in the rim to allow the retaining ring to be withdrawn from the rim.

3. A rim having a groove, a retaining ring having a groove, and a locking ring having inclined lugs slidable in recesses in the retaining ring for contracting it into engagement with the groove in the rim or to permit its expansion out of the groove in the rim to allow the retaining ring to be withdrawn from the rim.

4. A rim having a groove, a retaining ring having a groove, a locking ring in one groove, and coacting wedge means on the retaining ring and locking ring operated by a circumferential movement of the locking ring for changing its diameter to cause it to engage both grooves or to permit its expansion out of the groove in the rim to allow the retaining ring to be withdrawn from the rim, and means for locking the locking ring against circumferential movement.

In testimony whereof, I have hereunto set my hand at Los Angeles California this 12th day of November 1907.

JOHN BAKER.

In presence of—
GEORGE T. HACKLEY,
FRANK L. A. GRAHAM.